(12) United States Patent
Singer et al.

(10) Patent No.: US 11,456,010 B2
(45) Date of Patent: Sep. 27, 2022

(54) SYSTEMS AND METHODS FOR INCREASING DATA RATE AND STORAGE DENSITY IN MULTILAYER OPTICAL DISCS

(71) Applicant: Folio Photonics Inc., Solon, OH (US)

(72) Inventors: Kenneth D. Singer, Pepper Pike, OH (US); Irina Shiyanovskaya, Stow, OH (US); Asher Sussman, Northfield, OH (US); Thomas Milster, Tucson, AZ (US); Young Sik Kim, Tucson, AZ (US)

(73) Assignee: Folio Photonics Inc., Solon, OH (US)

(*) Notice: Subject to any disclaimer, the term of this patent is extended or adjusted under 35 U.S.C. 154(b) by 0 days.

(21) Appl. No.: 16/910,389

(22) Filed: Jun. 24, 2020

(65) Prior Publication Data
US 2020/0402534 A1 Dec. 24, 2020

Related U.S. Application Data

(60) Provisional application No. 62/865,575, filed on Jun. 24, 2019.

(51) Int. Cl.
*G11B 11/105* (2006.01)
*G11B 7/0037* (2006.01)

(52) U.S. Cl.
CPC ...... *G11B 11/10552* (2013.01); *G11B 7/0037* (2013.01); *G11B 11/10589* (2013.01)

(58) Field of Classification Search
None
See application file for complete search history.

(56) References Cited

U.S. PATENT DOCUMENTS

| | | | |
|---|---|---|---|
| 4,626,679 A | 12/1986 | Kuwayama et al. |
| 4,771,415 A | 9/1988 | Taki |
| 4,799,210 A | 1/1989 | Wilson et al. |
| 5,095,472 A | 3/1992 | Uchino et al. |
| 5,161,053 A | 11/1992 | Dabbs |

(Continued)

FOREIGN PATENT DOCUMENTS

| | | | |
|---|---|---|---|
| CN | 102735670 B | * | 10/2014 |
| CN | 106361266 A | * | 2/2017 |

(Continued)

OTHER PUBLICATIONS

International Search Report and Written Opinion from PCT/US2020/039288 dated Nov. 20, 2020 (22 pages).

(Continued)

*Primary Examiner* — William J Klimowicz
(74) *Attorney, Agent, or Firm* — Calfee, Halter & Griswold LLP

(57) ABSTRACT

Systems and methods, e.g., optical apparatuses, for digital optical information storage systems that improve the speed, signal to noise, controllability, and data storage density for fluorescent and reflective multilayer optical data storage media. The systems and methods include an optical system for a reading beam of a data channel from a moving single or multi-layer or otherwise 3-dimensional optical information storage medium that comprises at least one optical element characterized by restricting the field of view (FOV) of the reading beam on an associated image plane to 0.3 to 2 Airy disk diameters in a first direction.

17 Claims, 8 Drawing Sheets

(56) References Cited

U.S. PATENT DOCUMENTS

| | | | |
|---|---|---|---|
| 5,245,491 | A | 9/1993 | Horie et al. |
| 6,111,828 | A | 8/2000 | McLeod et al. |
| 6,869,419 | B2 | 3/2005 | Dragan et al. |
| 2004/0047271 | A1 | 3/2004 | Mizuno |
| 2006/0140070 | A1 | 6/2006 | Shiono et al. |
| 2006/0256451 | A1* | 11/2006 | Schaack ............ G02B 27/0025 359/741 |
| 2006/0279820 | A1* | 12/2006 | Riley .................... G02B 7/004 359/15 |
| 2007/0109941 | A1* | 5/2007 | Stallinga .............. G11B 7/1381 369/94 |
| 2008/0316898 | A1* | 12/2008 | Itoh ...................... G02B 21/006 369/112.01 |

FOREIGN PATENT DOCUMENTS

| | | |
|---|---|---|
| EP | 0934587 A1 | 8/1999 |
| JP | 5956239 | 6/2016 |

OTHER PUBLICATIONS

Dabbs T et al: "Fiber-Optic Confocal Microscope: FOCON", Applied Optics, Optical Society of America, Washington, DC, US, vol. 31, No. 16, Jun. 1, 1992, p. 3030-3035.

Method for Confocal Detection and Focus Error Signal in Optical Pickup Units for Optical Discs Drives, Nov. 14, 2017.

Differential Wax-Wane Focus Servo; Mark S. Wang, Tom Milster; Sep. 1, 1993, vol. 32, No. 25, Applied Optics.

Single-Mode Fibers Used as Confocal Microscope Pinholes; Tim Dabbs, Monty Glass; Jan. 15, 1991; Division of Wool Technology, Sydney Laboratory, Commonwealth Scientific and Industrial Research Organization.

Differential Confocal Microscopy With a Wide Measuring Range Based on Polychromatic Illumination; Jiubin Tan, Jian Liu and Yuhang Wang; Final Dec. 15, 2009; Published Mar. 23, 2010; Ultra-Precision Optoelectornic Instrument Engineering Institute, Harbin Institute of Technology (HIT).

Use of Optical Fiber Heads for Optical Disks; Frank S. Barnes, K.S. Lee, and Archibald W. Smith; Nov. 15, 1986, vol. 25, No. 22, Applied Optics.

Theoretical Analysis and Property Study of Optical Focus Detection Based on Differential Confocal Microscopy; Jiubin Tan, Fusheng Wang; Final May 17, 2002, Published Jul. 10, 2002; Department of Automation Measurement and Control Engineering, Harbin Institute of Technology.

Alignment-Free Fiber Confocal Microscope and All-Fiber Optical System for Multilayered Optical Memories; Masatoshi Tsuji, Wataru Inami, Yoshimasa Kawata; Revised Apr. 2, 2010, Published Aug. 20, 2010.

\* cited by examiner

SYSTEMS AND METHODS FOR INCREASING DATA RATE AND STORAGE DENSITY IN MULTILAYER OPTICAL DISCS

CROSS-REFERENCE TO RELATED APPLICATION

This application claims the benefit of U.S. Provisional Patent Application Ser. No. 62/865,575, filed Jun. 24, 2019, the priority of which is hereby claimed and the disclosure of which is incorporated herein by reference in its entirety.

FIELD OF THE INVENTION

The present invention relates to systems and methods, e.g., optical apparatuses, for digital optical information storage systems that improve the speed, storage density, as well as signal to noise and controllability for fluorescent and reflective single and multilayer or otherwise 3-dimensional optical data storage media.

BACKGROUND OF THE INVENTION

Commercial optical data storage media includes optical discs that rotate at high speed and are addressed for reading and writing using an optical pickup unit (OPU). For writing, focused laser light from an objective lens on the OPU impinges on the media at power sufficient to alter the optical properties of the media during a laser pulse. For reading, at low power, data is detected by an optical detection system on the OPU that differentiates the signal from the written and unwritten areas. Examples of methods to impart and detect the changes in optical properties include increases or decreases in reflectance (REF) from the written areas or increases or decreases in fluorescence (FL) from written areas.

Increasing the capacity of optical media is required to provide the performance and cost necessary for deployment of optical storage in enterprise data storage systems. One promising method is using multilayer discs to provide for three-dimensional storage. Multilayer Blu-ray and super-multilayer discs are two examples of media amenable to this approach. In order to provide the maximum capacity, storage density should be maximized in all three dimensions. The move to 405 nm wavelength lasers, high numerical aperture objective lenses, and enhanced tracking and writing control schemes have facilitated increased areal density. Approaches to increase capacity by increasing density in three dimensions has been limited by crosstalk arising from nearby interlayer, intersymbol (along data tracks) and intralayer (adjacent data tracks) signals both in read and servo processes.

Current interest for increasing areal density involves reducing the size of data tracks. However, the field of view (FOV) exceeds the track separation, which leads to intralayer (areal) crosstalk from signals arising from adjacent tracks, limiting the track separation and areal storage density. In addition, higher density can also be achieved by reducing the separation between layers in a multilayer medium. In this case, interlayer (axial) crosstalk limits layer separation, and consequently, volume data storage density. Interlayer crosstalk arises from both coherent and incoherent signals arising from layers away from the focus.

FL data storage schemes include media that emit light across a spectral band when excited by a source in the absorption band of the luminescent media. Such emissive media can include fluorescent dyes, semiconductor nanoparticles such as quantum dots, plasmonic nanoscopic metal species, and combinations thereof. The detection of digital data at high speed can be limited by the emission lifetime of the FL species compared to the scan rate of the OPU causing intersymbol crosstalk. In addition, spherical, chromatic and spherochromatic aberrations can limit the ability to focus and collect light across the emission spectrum. Both chromatic aberrations in the optical system as well as spherical aberration due to the combination of high numerical aperture objective lenses and the thickness of the multilayer media contribute to the total aberrations.

When reading optical signals from a fluorescent optical storage medium either for interpreting data or effecting servo control at high speed, the finite fluorescence emission lifetime of an emissive species can limit the read speed. In some cases, the emission lifetime is longer than the residence time of the focused excitation spot on a single data mark. This can cause the fluorescent signal (fluorescent tail) from previously excited areas within the FOV of the detection optics to confound detection of the single data mark. This can lead to intersymbol crosstalk and a reduction in signal to noise.

Detection schemes based on pinholes are known to limit FOV, limit intralayer crosstalk and to limit interlayer crosstalk. The basic principle is to re-image the focused laser spot onto a pinhole aperture in the detection path, thus limiting the FOV and intralayer crosstalk. A detector is placed behind the pinhole to collect the signal energy. Light from neighboring tracks are blocked at the pinhole, for which the pinhole diameter is designed for proper spatial filtering to confine collected light to a single track. The system limits interlayer crosstalk by utilizing the principle that, when light from surrounding layers is impinging on the pinhole, it is distributed over a larger area than the in-focus layer. Thus, a significantly smaller percentage of light passes through the pinhole from surrounding layers.

However, difficulties in aligning pinholes and maintaining alignment has precluded their use in commercial optical drives. Applicants realized that there is, therefore, a need to develop a practical system that decreases alignment difficulty with mechanical pinholes and establishes limited FOV for inter-layer crosstalk from neighboring tracks and fluorescent tails. Applicants appreciated that limiting interlayer crosstalk can be achieved by maintaining a confocal condition. Optimally, the confocal condition is maintained over the bandwidth of the FL emission if used with FL media. Applicants realized there is also a need to develop practical focus servo feedback signals for such systems.

SUMMARY OF THE INVENTION

A confocal detection system is disclosed herein that may increase the areal resolution and signal to noise ratio (SNR) of detection by reducing FOV. Specifically, the system can maintain a detection FOV comparable to a data mark dimension corresponding to the focus of excitation light, which effectively isolates the desired signal from unwanted, extraneous, or erroneous signals (e.g., fluorescence from previously excited areas outside of the current focus). It can exclude stray fluorescence nearly entirely from the detection process. The system's increased areal and axial resolution of the confocal detection system can reduce interlayer crosstalk and intralayer crosstalk from neighboring tracks in a given layer of the medium. In addition, the fiber systems it employs can allow for lighter weight OPUs and easier maintenance.

An exemplary optical system for a reading beam in an optional OPU data channel of a moving three-dimensional optical information storage medium, in accordance with the present disclosure, comprises at least one optical element characterized by restricting the FOV of the reading beam on an associated image plane from 0.3 to at least 2 Airy disk diameters in a first direction as an optional condition for confocal detection.

Another exemplary optical system for a reading beam in an optional OPU data channel of a moving three-dimensional optical information storage medium comprises: a reading optical detector; and an optical path between an objective lens and the reading optical detector; and wherein the reading optical detector has an active area that is sized to restrict the FOV of the reading beam on the active area to 0.3 to at least 2 Airy disk diameters in a first direction.

An exemplary optical system for generating a focus-error signal (FES) and a data signals from a moving three-dimensional optical information storage medium, comprises: an FES subsystem comprising first and second optical fibers with appropriately designed focal planes and FOV used for differential confocal FES detection from the optical information storage medium, the two optical fibers having signals arising from two different planes in the object space situated symmetrically on either side of the data signal plane of the optical data storage medium; and a data subsystem comprising a third optical fiber focused with respect to the optical information storage medium between the foci of the two optical fibers for read signal acquisition from the optical information storage medium.

Examples of optical information storage media include Blu-ray, CD-ROM, DVD-ROM, DVD-RAM, optical tape, recordable media, write-once read-many (WORM) optical cartridges, and erasable optical cartridges. It is to be understood that, though the present disclosure refers to discs as exemplary optical media, the present disclosure generally applies to various types of optical media other than optical disc media.

An exemplary FOV limiting device in an OPU for multilayer optical data storage restricts the FOV of the reading beam on the object plane to less than 2 Airy disk diameters. Preferably, device has a limiting aperture reducing FOV to that equal to or less than the diameter of the data mark, as small as 0.3 or 0.5 Airy disk diameters. The multilayer optical media could be either REF or FL, and corresponding readout signals for data channel and focusing could be also either REF or FL. Limited FOV allows for reduction of intralayer cross talk from adjacent written bits in the layer upon reading, especially for media with high track density as it can confine the detected signal to a single track. In case of FL optical media, limited FOV also allows for a high readout rate by eliminating intersymbol crosstalk even in a case of a long fluorescence lifetime of the media fluorophores. In addition, the confocal aperture of the fiber eliminates signals coming from non-addressed or out of focus layers resulting in increase of axial resolution of device and increase the signal-to noise ratio.

An exemplary device for generation of FES and data signals in an OPU is comprised of 2 optical fibers used for differential confocal FES detection and 3rd optical fiber for read-signal acquisition. The device includes first and second optical fibers for FES detection from the light returning from optical data storage media. Laser light is applied to a multilayer optical recording medium and a FES is detected using a returning light from the optical medium. Images at the input to the first and second optical fibers arise from optical paths emanating from planes that are equidistant on either side of the excitation light focal plane. The diameter of the fibers for FES acquisition is in the range from 1 to 10 microns, preferably lower than 3 microns. The confocal apertures of the fibers eliminate signals coming from non-addressed or out of focus layers resulting in increase of axial resolution of device and increase the signal-to noise ratio. It is possible that this FES device can also act as the signal acquisition channel when taking the sum of the two fiber signals.

Presented herein is an exemplary FOV limiting device for multilayer optical data storage, for FES, and read signal generation for FL media. The device is compatible with polychromatic signals having a full-width-at-half maximum (FWHM) bandwidth up to 50 nm. A special two-sided aspheric diffractive optical element can be used in the FES channel(s) and the read channel(s) for compensation of chromatic and spherochromatic aberrations. Reduced aberrations allow for a significant increase of signal-to-noise ratio for data readout and FES signals.

DETAILED DESCRIPTION

Disclosed herein are fiber-optics-based OPU apparatus for the confocal detection of light arising from single, multilayer, or otherwise 3-dimensional optical data storage media, such as an optical storage disc, tape, cylinder, etc. In exemplary embodiments, the medium is moving with respect to the OPU, such as, without limitation spinning (e.g., for a spinning disc format optical medium), longitudinally moving (e.g., for thread or tape format optical media), rotating (e.g., for a rotating cylinder format optical medium), or other movement for other media formats.

The OPU apparatus may provide one or more of the following functions for operation of the optical data storage system: a) data writing, b) illumination for data detection, c) detection of written data, d) focus servo, and e) tracking servo. The OPU apparatus relates to the detection path necessary for functions c, d, and e and optimization of these functions. Exemplary embodiments of the present disclosure may include three detection paths. The detection paths can be based on three fiber optic receivers that direct light from the OPU to optical detectors at the distal end of the fibers. These three fibers may reduce intralayer, intersymbol, and interlayer crosstalk, and effect other beneficial properties.

A confocal detection system in the OPU apparatus can increase the areal and axial resolution and reduce the FOV to the resolved dimension. The reduced FOV of the detection reduces fluorescence from previously excited data marks. This stray fluorescence is excluded from the detectors by the optical system. When the FOV is comparable to a data mark dimension corresponding to the current focus of the excitation light, the desired signal is effectively isolated, resulting in high signal to noise.

It has been shown that fiber optic based confocal detection systems are significantly easier to align and their alignment easier to maintain than in aperture-based confocal systems. [1,2] As a consequence, confocal fiber detection systems are more amenable to mass-production than aperture confocal systems. In addition, the coherent nature of the optical transfer function of a fiber-based system (due to the coherent fiber modes) allows for coherent detection schemes that could, for example, further reduce interlayer crosstalk in reflective optical storage systems. [3] Increased areal and axial resolution of the confocal detection system may reduce interlayer crosstalk and intralayer crosstalk from neighboring tracks in a given layer. In addition, fiber systems may allow for lighter weight OPUs and easier maintenance.

Figure 1:
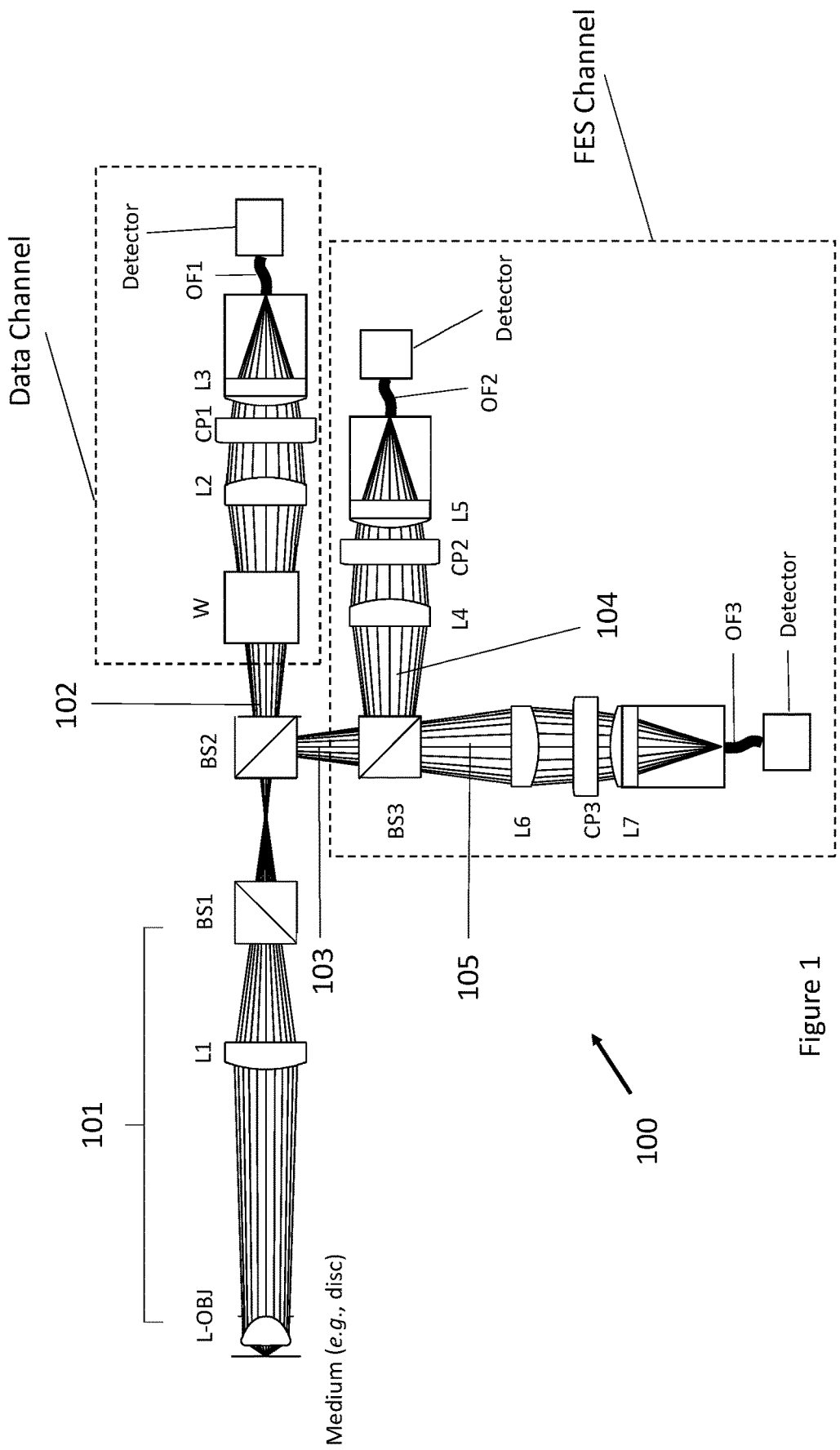
FIG. 1 shows an exemplary embodiment OPU system including Data and FES channels.

An exemplary embodiment 100 of the OPU apparatus of the present disclosure is shown in FIG. 1. Although many of the advantages, features, and modifications of the present disclosure will be discussed in the context of embodiment 100, it is to be understood that these advantages, features, and modifications may apply equally to other embodiments, i.e., embodiments 200-700 shown in FIGS. 2-7, respectively.

In exemplary embodiment 100, the OPU detection system includes two channels, the Data Channel and the FES Channel. The Data Channel includes one optical fiber output (OF1) and the FES Channel includes two (OF2 and OF3). The optical design of the system 100 can be optimized for a number of benefits that arise from the use of all three optical fibers (OF1, OF2, and OF3) together in the design.

Reduction of the FOV in embodiment 100 allows for high read speed in FL detection systems. When a storage medium is moving at a speed in the range of m/sec, finite emission lifetime can cause intersymbol crosstalk. The crosstalk may result in detection of light emitted from an area substantially greater than that of the presently focused laser spot, thus limiting signal-to-noise ratio (SNR) (carrier-to-noise ratio or CNR) of the detection. If, instead, the detected light is limited to the presently focused spot, high SNR (CNR) is restored as light emitted from areas away from the Airy disk of the focused laser spot is excluded by the FOV from the detector. This excludes light that was first emitted from a point outside of the Airy disk (or multiples thereof) at an earlier time, within the emission lifetime, from reaching the detector.

The optical design of embodiment 100 also increases areal resolution effected by the selection of the confocal lens-fiber combination that decreases the FOV on the object plane. The decreased FOV reduces intralayer crosstalk between tracks by limiting the light advancing to the detectors to that arising from a single data mark confined to a single track.

The optical design of embodiment 100 can increase axial resolution through spatial filtering effected by selection of the lens-fiber combination leading to confocal-like axial sectioning. This axial sectioning function can reduce interlayer crosstalk allowing layers on the medium to be located closer together. The detailed optical design of the lens-fiber combinations results in images from three planes in the object space: a) the Data Channel is focused in the layer from which the signal arises, b) the FES Channel contains two lens-fiber combinations (i.e., the lens-fiber combinations corresponding to OF2 and OF3 in FIG. 1, respectively) such that one is in focus slightly in front of the layer from which the signal arises and the other slightly behind. In the case of b), the difference in the signals arising from the detectors in this channel provides the FES. This FES is constructed from the two signals that each provide the reduced FOV and axial sectioning.

The presence of diffractive elements in the optical paths between the storage medium and detectors, in combination with appropriate refractive aspherical and/or apochromatic or achromatic focusing elements, further corrects the optical imaging system for chromatic and/or sphero-chromatic aberrations.

Fibers OF1, OF2, and OF3 may incorporate sensitive optical detectors ("Detectors," illustrated schematically in FIG. 1). Examples of suitable highly sensitive detectors include avalanche photodiodes (APD) or photomultiplier detectors (PMD) resulting is increased sensitivity and better SNR (CNR) compared to PIN diode detectors. The use of distal, remote, or off-OPU detectors can be advantageous in that they can allow for: a) reducing the OPU mass, b) enhanced thermal management, and c) more easily serviced or replaced detectors, potentially extending the life of the optical drive.

The OPU in exemplary embodiment 100 may take advantage of low-cost fiber optic manufacturing/alignment/connector methods. Typical read speeds for moving media are in the nanosecond ($10^{-9}$ sec) range per written datum. Confocal detection systems may include a small pinhole to filter out high spatial frequencies. Aligning the pinhole in the OPU relative to the optic axis and axial position near a conjugate point can be difficult in commercially viable drives.

Fiber optic confocal imaging systems used in embodiment 100 can attain the performance of traditional pinhole systems with several advantages. Foremost, the system 100 can place the filtering elements in or near the collimating regions (not shown) of the Detectors. The exemplary embodiments (e.g., 100) may include an integral lens/optical fiber component, some of which are commercially available at relatively low-cost. Such components can be aligned using coaxial alignment elements to align the lenses (e.g., L3, L5, and L7) and their respective fibers (OF1, OF2, and OF3). The lenses may be fixed with adhesive. In these cases, the lens/fiber component may then be easily aligned into the collimated or near-collimated. In other words, the lens/fiber component may be collimated to a degree sufficient to easily/readily align the collimating lens and fiber and to maintain alignment to a manufacturable tolerance (e.g., a tolerance sufficient or greater than that needed for alignment of a pinhole confocal system). This can be done by maximizing the signal in an optical detector placed at the distal end of the fiber. Such a detector may also be permanently affixed to the fiber to create a single component.

Applicants have found the optical transfer function (OTF) to be helpful in describing aspects of the OPU of the present application. OTF has been described in detail by Gu and co-workers in the context of the operation of a fiber optic confocal scanning microscope [4,5], incorporated herein by reference.

Figure 2A:
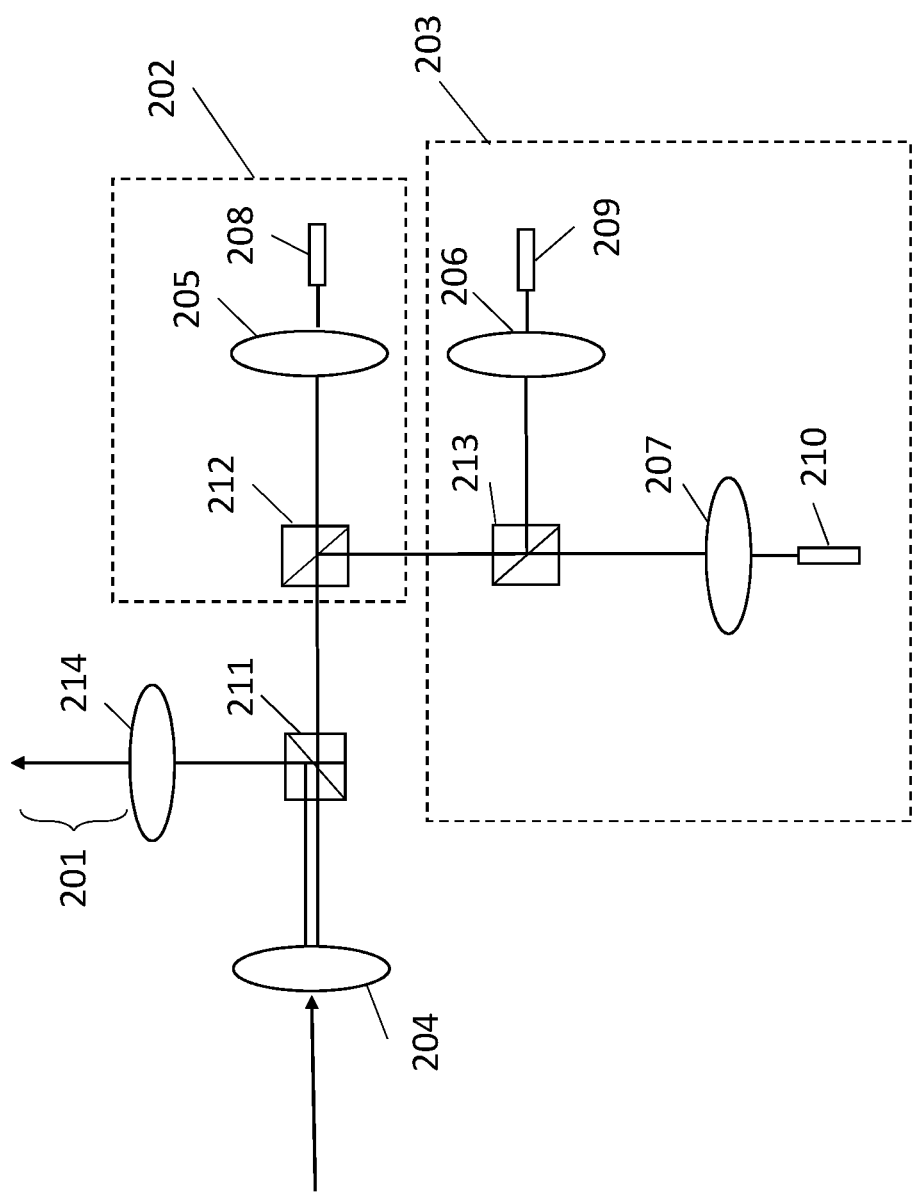
FIG. 2A is a schematic showing the basic layout determining the optical transfer function (OTF) in the case where aberrations can be ignored.

FIG. 2A illustrates the basic layout determining the OTF in the case where aberrations can be ignored. Shown are the excitation path 201 from a laser (e.g., a 405 nm laser) as well as the reading streams for data 202 and differential confocal FES 203, including an objective lens 204 and coupling lens(es) (205 and 206/207, respectively). Elements 208, 209, and 210 are fibers carrying their respective signals. Elements 211, 212, and 213 are beam splitters. Element 214 is a lens associated with the excitation. The reading stream 202 includes the objective lens 204 and coupling lens 205 as a confocal pair. For a given objective lens 204, a degree of confocal filtering determines the reduced FOV. Axial sectioning is determined by a dimensionless fiber core dimension, A. This is mathematically expressed via Equation 1:

$$A = \frac{2\pi a_0 r_0}{\lambda d} = 2\pi r_0 \frac{1.22}{D_A} \quad \text{(Equation 1)}$$

where: $a_0$=the pupil radius of the coupling lens focusing into the fiber, d=the distance of the coupling lens from the fiber input, $r_0$=the fiber core radius and $\lambda$ the wavelength. The quantity $a_0/d$ defines the numerical aperture (NA) of the coupling lens. The quantity $D_A$ in Equation 1 is the Airy disk diameter given by $1.22 \lambda d/a_0 = 1.22\lambda/NA$. The parameter A is similar to the number of Airy disk diameters in a pinhole confocal detection system, but adjusted for optical fibers.

Parameter A affects the cut-off frequencies for the OTF in both axial and in-plane directions. By varying the fiber core radius $r_0$ and the distance d, it is possible to maximize the signal level on the detector by matching the fiber mode profile and the field distribution on the fiber.

When A=0, the OTF corresponds to the point source and point detector case. For a case of a finite sized source and detector, increasing the parameter A by increasing the $r_0$ size results in a narrower OTF, thus decreasing the spatial cut-off frequencies and, and consequently, the system resolution. This lower resolution corresponds to a larger FOV. The parameter A can be varied over a wide range by choice of the distance d and fiber core radius $r_0$. For $r_0$ in the range of 1-5 microns (e.g., 2-3 microns), and lens pupil radius $a_0$ of 3-5 mm, the parameter A can change in the range from 0.5 to 10 depending on the distance d. For small values of A, the resolution is improved leading to a smaller FOV and finer optical sectioning. Typically, an amount of light coupled into the fiber decreases with $r_0$. This creates a trade-off between resolution and signal to noise ratio (SNR). A decrease in SNR can be at least partially offset by the gain from SNR increase by eliminating the intersymbol crosstalk coming from the finite emission lifetime and the use of highly sensitive APD or PMD detectors.

For a given fiber, reducing the numerical aperture of the coupling lens increases the confocality. This results in higher resolution both in-plane and in the axial dimension. [6]. The confocal behavior of the fiber-based detection system for all three fibers (OF1, OF2, and OF3) is thus based on the image of the data mark on the input face of the fiber and matching the guided mode dimensions. Reducing the effective numerical aperture of the coupling lens enlarges the image, which can mismatch the fiber mode. This may reduce the amount of light coupled into the fiber and thus SNR. In exemplary embodiments, a reduced FOV may be obtained by designing the optical system so that the Airy disk diameter (the first zero) substantially matches the size of the fiber mode diameter. In exemplary embodiments, the Airy disk diameter may be ½ to 2 times the mode diameter. A tradeoff between SNR and can be attained when 0<A<5, such as A=0.5-5, e.g., A=2-4. In an exemplary embodiment, $a_0$=1.5 mm, $r_0$=1.25 μm, and d=12 mm. Using Equation 1, this corresponds to A=3.85.

In exemplary embodiments, areal resolution and FOV may be approximately the same size as the data mark dimension on the medium in one or more directions. In this case, the axial resolution is improved. In some exemplary embodiments, the FOV is 145-155 nm long, e.g., about 150 nm, long. This is about the same length as the minimum pit length under the Blu-ray disc standard. The FOV may be 125-135 nm wide, e.g., about 130 nm wide. This is approximately the same width as the minimum pit width under the Blu-ray disc standard. Reduced FOV may eliminate the SNR/CNR reduction caused by the finite emission lifetime in FL media when due to the data bit residence time on a data bit being comparable to emission lifetime (less than 5 nanoseconds). The optimum size of FOV is determined by trading off the signal from intersymbol crosstalk with the decreased signal from the reduced FOV.

The illumination system is not shown explicitly in FIG. 1, apart from beamsplitter (BS1) that directs light from the illuminating laser to the storage medium through the objective lens (L-OBJ). The light returning from the Medium either as FL or REF is directed along the path 101 shown from L-OBJ. Lens L1 can be a movable relay lens that can eliminate spherical aberration encountered when L-OBJ addresses the various layers. A second beamsplitter, BS2, splits the light returning from the medium between the Data and FES Channels. Diffractive chromatic correction components CP1, CP2, and CP3 may be included for FL media due to the spectral bandwidth of the emitted light and insufficient aberration correction by the lenses. CP1, CP2, and CP3 can be located as a separate element in the optical path between the storage medium and detector (as shown in FIG. 1), or can be imparted on the surface of a refractive element in the optical path 101 including the objective lens L-OBJ. In exemplary embodiments, the spectral bandwidth of the polychromatic signal emitted by the fluorescent media may have a full width at half maximum (FWHM) bandwidth of 20-50 nm, e.g., 35-45 nm, e.g., about 40 nm. The lens pairs L2/L3, L4/L5, L6/L7 may be designed for the primary functions of focusing into their respective optical fibers (OF1, OF2, and OF3, respectively) generating the FES and data signals at their distal Detectors. In exemplary embodiments, the optical fibers (OF1, OF2, and OF3) may have a core diameter of 2-3 microns, e.g., about 2.5 microns. In exemplary embodiment 100, lenses L3, L5, and L7 can be identical. In this example, the lenses L3, L5, and L7 may comprise a collimator package, while the lenses L2, L4, and L6 may impart the functions for FES and data detection. The component W in the Data Channel provides an optical path difference to match the phase shift introduced in the FES channels by BS3.

A detailed, exemplary optical prescription for variations of exemplary embodiment 100 is shown in Table 1.

TABLE 1

Details of exemplary implementation of FIG. 1.

| Surface | Type | Radius | Thickness | Glass | Component |
|---|---|---|---|---|---|
| OBJ | | Infinity | 0.000 | | |
| 1 | SPHERE | Infinity | 0.005 | ACTIVE LAYER | Disc |
| 2 | SPHERE | Infinity | 0.048 | BUFFER LAYER | |

TABLE 1-continued

Details of exemplary implementation of FIG. 1.

| Surface | Type | Radius | Thickness | Glass | Component |
|---|---|---|---|---|---|
| 3 | SPHERE | Infinity | 0.015 | COVER LAYER | |
| 4 | SPHERE | Infinity | 0.816 | | |
| 5 | ASPHERE | 4.820 | 2.400 | U-SK12M | L-OBJ |
| 6 | ASPHERE | −1.477 | 0.000 | | |
| STO | SPHERE | Infinity | 0.000 | | |
| 8 | SPHERE | Infinity | 20.000 | | |
| 9 | ASPHERE | 8.865 | 2.209 | D-ZK3M | L1 |
| 10 | SPHERE | Infinity | 8.000 | | |
| 11 | SPHERE | Infinity | 5.000 | N-BK7 | BS1 |
| 12 | SPHERE | Infinity | 2.343 | | |
| 13 | SPHERE | Infinity | 4.000 | | |
| 14 | SPHERE | Infinity | 2.054 | | |
| 15 | SPHERE | Infinity | 5.000 | N-BK7 | BS2 |
| 16 | SPHERE | Infinity | 5.000 | | |
| 17 | SPHERE | Infinity | 5.000 | N-BK7 | W/BS3 |
| 18 | SPHERE | Infinity | 4.000 | | |
| 19 | SPHERE | Infinity | 3.220 | | |
| 20 | SPHERE | Infinity | 2.209 | D-ZK3M | L2/L4/L6 |
| 21 | ASPHERE | −8.865 | 0.000 | | |
| 22 | SPHERE | Infinity | 6.000 | | |
| 23 | SPHERE | Infinity | −3.220 | | |
| 24 | ASPHERE | Infinity | 2.000 | N-BK7 | CP1/CP2/CP3 |
| 25 | SPHERE | Infinity | 0.0001 | SWEATT | |
| 26 | ASPHERE | −211935.400 | 1.000 | | |
| 27 | ASPHERE | 8.865 | 2.209 | D-ZK3M | L3/L5/L7 |
| 28 | SPHERE | Infinity | 6.704 | | |
| IMA | SPHERE | Infinity | 0.000 | | OF1/OF2/OF3 |

Aspheric Coefficients $$Z = \frac{Y^2}{R\left(1 + \sqrt{1 - (1+k)Y^2/R^2}\right)} + \sum_{i=2}^{10} A_{2i} Y^{2i} \quad \text{(Equation 2)}$$

Y: Height from optical axis
k: Conic constant
$A_{2i}$: Aspheric coefficient of $i^{th}$ order
R: Paraxal radius of curvature Equation 2 describes the design of the aspheric surfaces, where Z is location of the lens surface in the paraxial direction at the position Y.

TABLE 2

Parameters for implementing Equation 2:

| Component | Surface | R | k | A4 | A6 | A8 |
|---|---|---|---|---|---|---|
| L-OBJ | S5 | 4.820 | −67.72884 | −8.886667E−02 | 8.481057E−02 | −5.581410E−02 |
| | S6 | −1.477 | −0.68099 | −6.368637E−03 | −9.296797E−03 | 1.561820E−02 |
| L1/L2/L3/L4/L5//L6/L7 | S9/S21/S27 | 8.865 | −0.543613 | −6.83121E−06 | −1.17646E−07 | −9.09105E−10 |
| CP1/CP2/CP3 | S24 | Infinity | 0 | 0 | 0 | 0 |
| | S26 | −211935.400 | 2.075962E+08 | 2.10574E−08 | −1.34006E−09 | 1.31105E−10 |

| Component | A10 | A12 | A14 | A16 | A18 | A20 |
|---|---|---|---|---|---|---|
| L-OBJ | 2.365035E−02 | −5.445608E−03 | 5.230201E−04 | 0 | 0 | 0 |
| | −1.938994E−02 | 1.455097E−02 | −6.858746E−03 | 1.971419E−03 | −3.166614E−04 | 2.181064E−05 |
| L1/L2/L3/L4/L5//L6/L7 | 0 | 0 | 0 | 0 | 0 | 0 |
| CP1/CP2/CP3 | 0 | 3.30881E−08 | −3.93893E−09 | 1.50390E−10 | 0 | 0 |
| | 0 | 0 | 0 | 0 | 0 | 0 |

The operation of an exemplary FES channel is now described. Referring back to FIG. 1, the returning signal from the medium passes through a non-polarizing beam splitter BS2 and divided into 2 beams, beam 102 for a data channel and beam 103 for FES channel. In the FES channel, differential confocal operation is affected when the fluorescent beam is further divided into two beams 104 and 105 by non-polarizing beam splitter BS3 that are focused by a lens or lens system packages into two single-mode fibers connected to the Detectors (e.g., APD detectors). The foci in the two channels 104 and 105 have object plane foci displaced by +u and −u in the axial direction, respectively, relative to the focus location in the addressed layer in the data channel. In exemplary embodiments, the object plane foci displaced by, e.g., ±0.12 mm. The resulting light is coupled into two optical fibers (e.g., OF2 and OF3 shown in FIG. 1) and directed to two APD detectors being one in front of and the other behind the focal plane of the data channel. FES is generated by the difference between the signals from the two Detectors for OF2 and OF3.

Figure 2B:
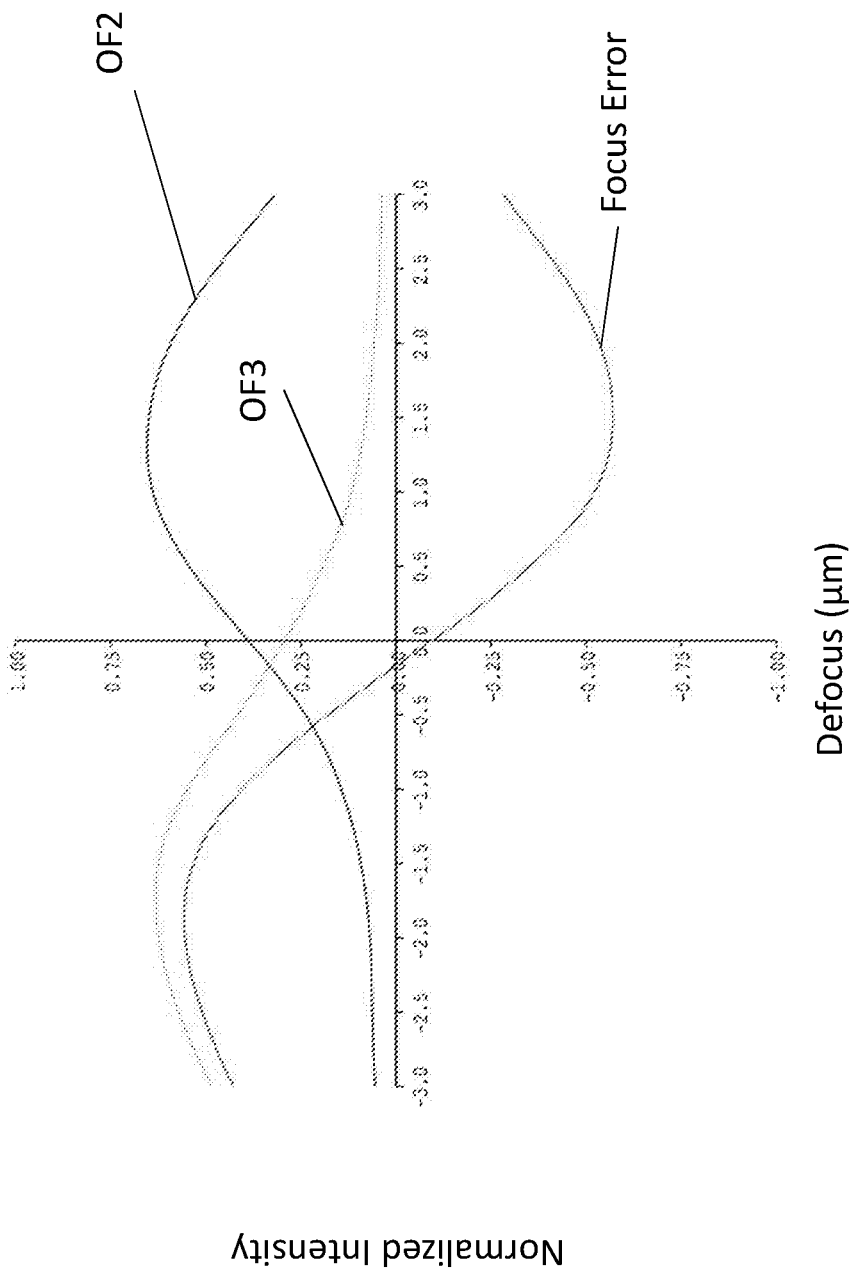
FIG. 2B is a plot showing the intensity of light vs. Defocus for two optical fibers (OF2 and OF3) and Focus Error for the embodiment shown in FIG. 1.

A simulated FES curve for exemplary embodiment 100 is shown in FIG. 2B, with the signals from OF2 and OF3 both being above the X-axis and FES extending from the upper-left quadrant to the lower-right quadrant. Confocal-like spatial filtering reducing the field of view can be designed by appropriate choice of lenses L4/L5 and L6/L7, fiber core diameter and various distances in embodiment 100. The Detectors may all be connected to one or more control units (also not shown), which use the FES signal to control actuators (not shown) that adjust the focus of the objective lens with respect to the medium, e.g., adjust the focus to tend to make the focus error signal zero.

In the embodiment 100 of FIG. 1, lenses L3, L5 and L7 may be identical. Variation in foci among L3, L5 and L7 may be determined by choice of lenses L2, L4 and L6 so that the L2 provides an image of light emanating from the signal layer. Lenses L4 and L6 can be chosen to create two signals, one emanating from a plane in front of and one from behind the layer to be addressed. Thus, focus on the object plane may be chosen to within the layer of the medium to be addressed. Lenses L4 and L6 can be chosen to optimize a resulting S-curve created by the difference in detected light intensity between the two detectors in the FES channel (in other words provide a symmetric S-curve whose zero crossing corresponds to the focal plane of the excitation beam). The lenses may also be chosen to improve the overall signal level and improve FOV (e.g., to provide a FOV that minimizes axial and areal crosstalk and results in a CNR of at least 30 dB).

Additional variations in design for embodiment 100 and others are apparent from the teachings herein:

Alternative 0. The lenses L2, L4, and L6 are identical, and the various focal planes are attained by positioning the lenses differently relative to one another. The lens L4 position is +0.12 mm and lens L6 position −0.12 mm relative to lens L2 position or vice versa. An example 100 is shown in FIG. 1.

Figure 3:
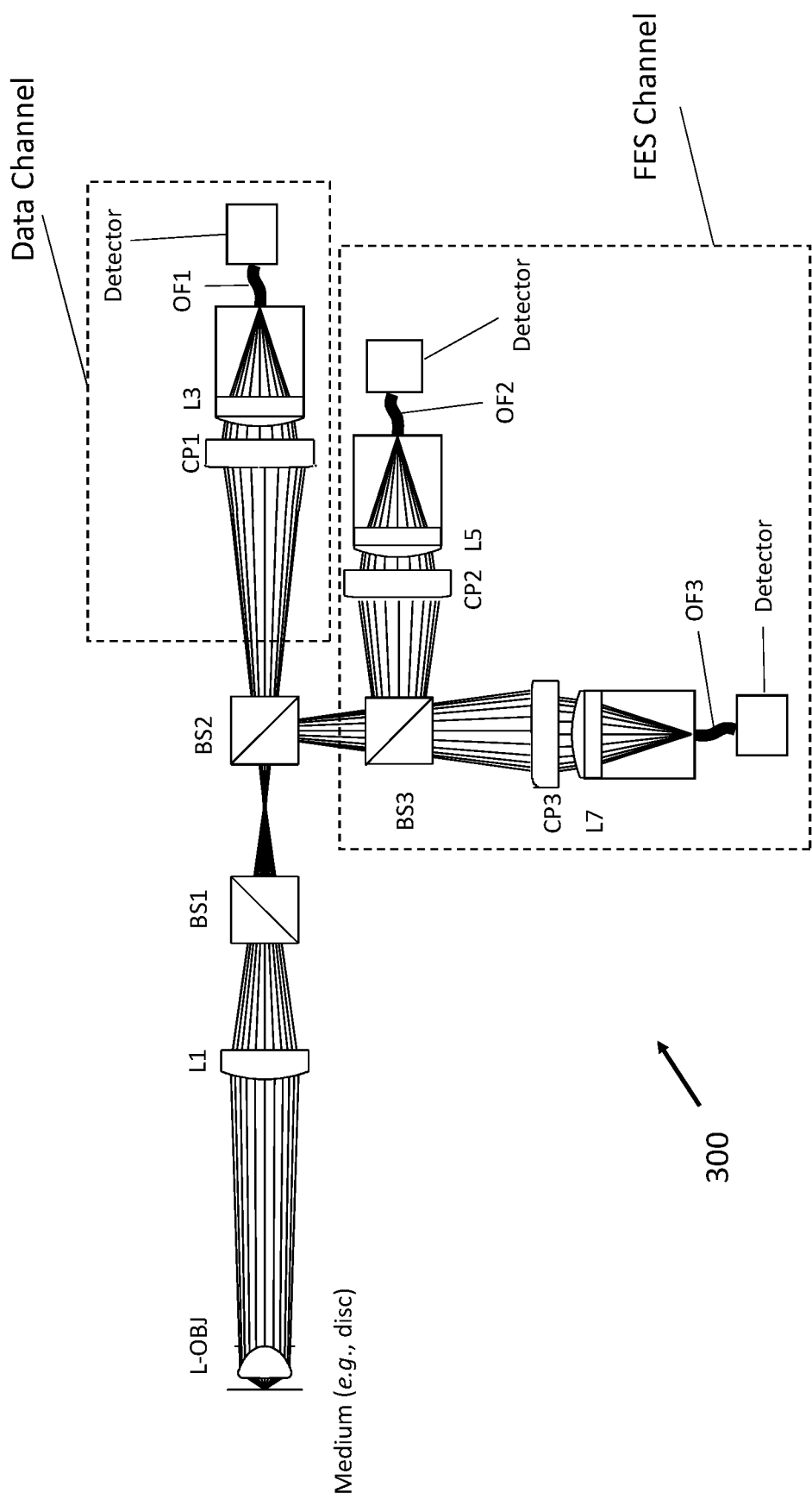
FIG. 3 shows another exemplary embodiment OPU system including Data and FES channels.

Alternative 1. The lenses L2, L4, and L6 can be eliminated and the differential focus obtained through design of L3, L5, and L7 which now differ from each other, and create the 3 separate and different foci. CP1, 2, and 3 can be designed for color correction for FL systems. An example 300 is shown in FIG. 3.

Figure 4:
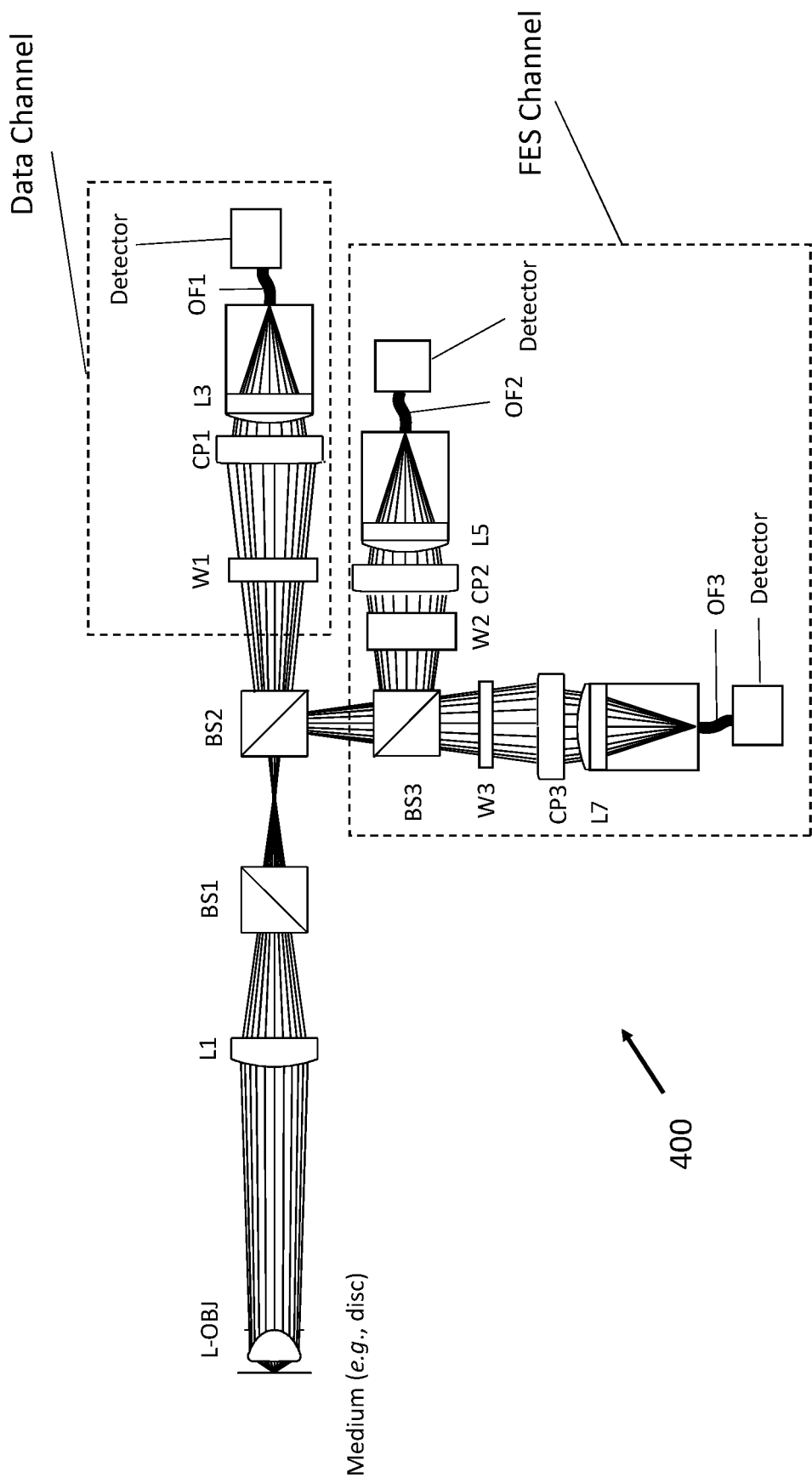
FIG. 4 shows another exemplary embodiment OPU system including Data and FES channels.
Figure 5:
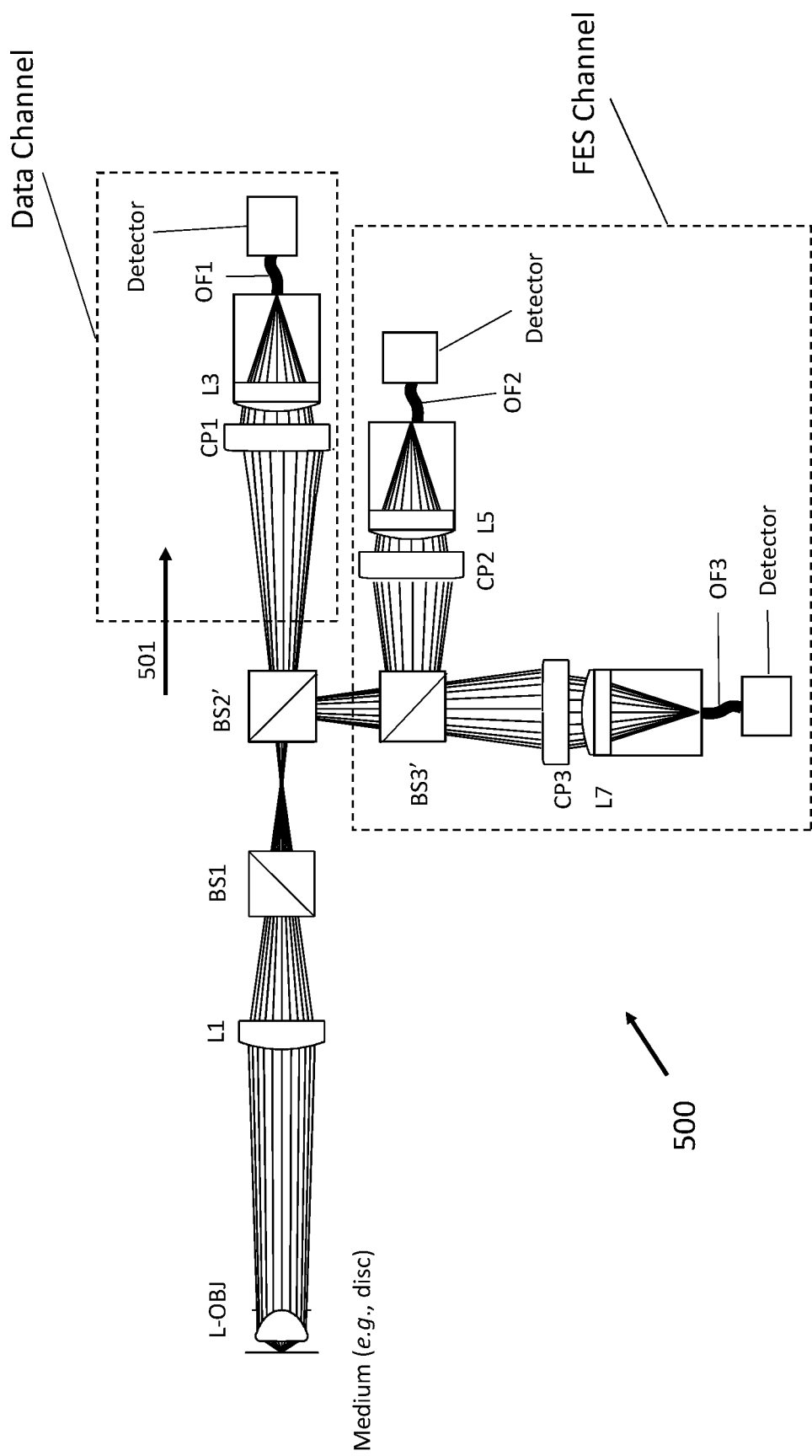
FIG. 5 shows another exemplary embodiment OPU system including Data and FES channels.
Figure 6:
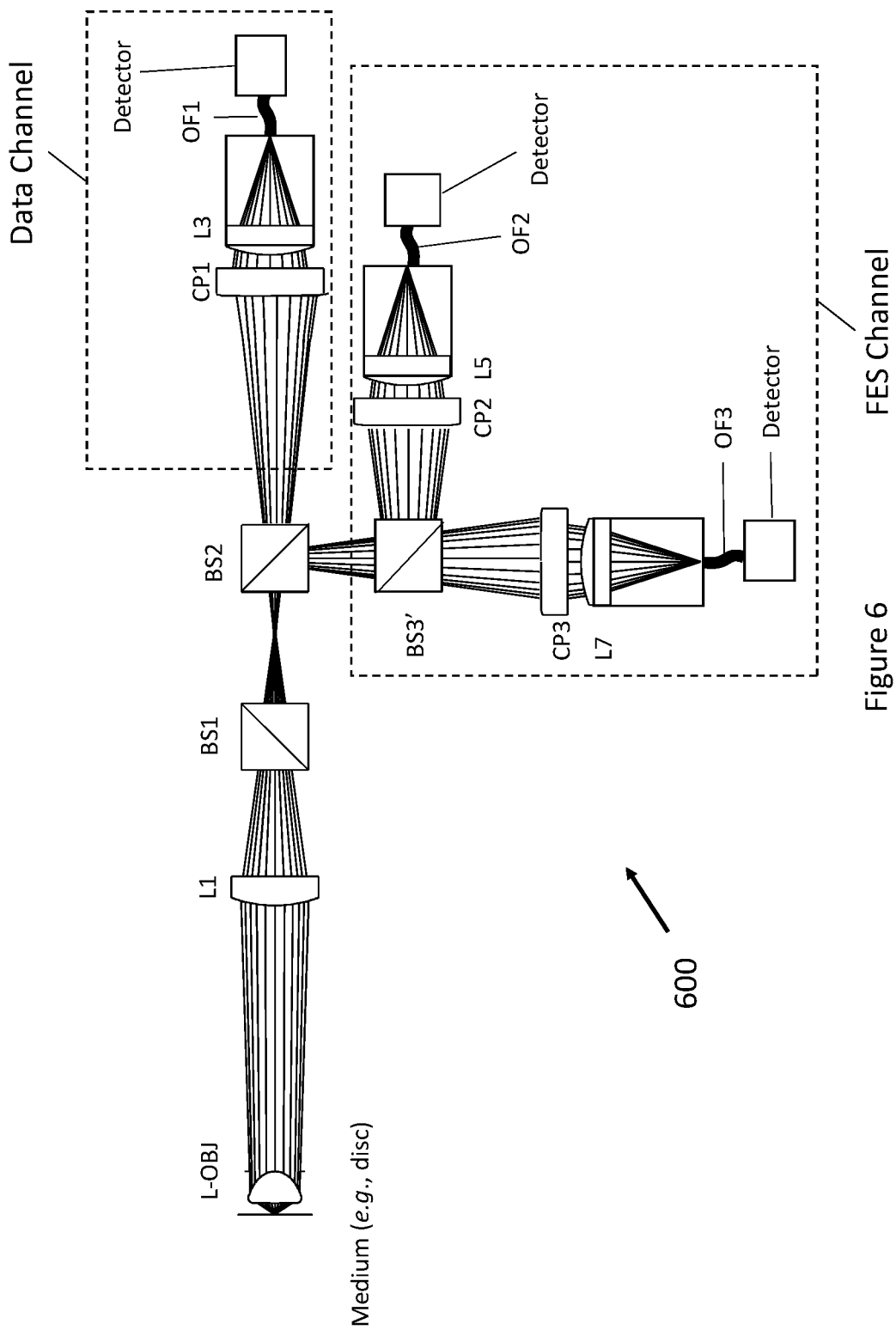
FIG. 6 shows another exemplary embodiment OPU system including Data and FES channels.

Alternative 2. Additional phase plate windows, W1, W2, and W3, can be inserted into each path to adjust the foci for operation as described above. The refractive index and thickness of W1, W2, and W3 can be separately chosen to determine the three foci. In this case, lenses L3, L5 and L7 can be identical. An example 400 is shown in FIG. 4.

Alternative 3. Phase shift can be carried out using phase asymmetric beamsplitters BS2' and BS3', with an example configuration 500 shown in FIG. 5. Beamsplitters BS2' and BS3' can be chosen so that a phase shift in the OF1 direction (direction 501) is intermediate between those of OF2 and OF3. In this case, lenses L3, L5 and L7 can be identical.

Alternative 4. Differential focus can be obtained by using phase asymmetric beamsplitter BS3', with an example 600 shown in FIG. 6. Beamsplitter BS3' can be chosen so that the object plane foci in the OF2 and OF3 directions are displaced by in front of and behind the layer of interest. In this case, lenses L5 and L7 can be identical.

Though not shown in explicitly in FIGS. 1, 3-6, the various embodiments herein can have an associated illumination system generating a reading beam and a system for a tracking servo. Other optical devices and methods that function similarly among the detected signals of OF1, OF2, and OF3 are possible. These functions provide for the object plane foci to be arranged so the data channel is focused in the addressed layer and the FES channel has the two focused behind and in front of the addressed layer. All may be designed to provide the appropriate FOV and axial sectioning.

Figure 7:
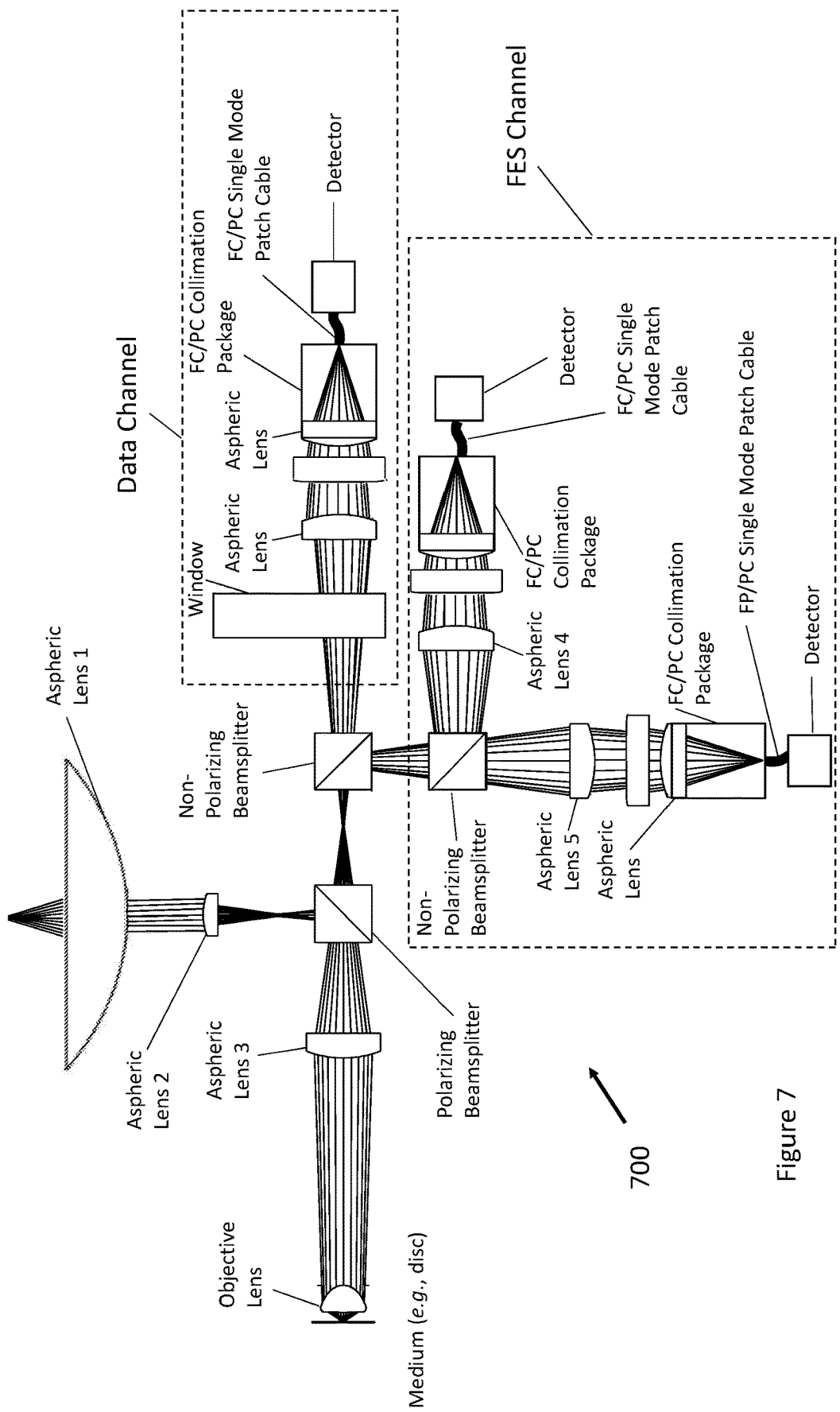
FIG. 7 shows another exemplary embodiment OPU system including Data and FES channels.

FIG. 7 shows another exemplary embodiment 700. In embodiment 700, a reading beam from a light source, e.g., a 405 nm laser diode (not shown) is introduced via Aspheric Lens 1 and Aspheric Lens 2 and eventually focused by the Objective Lens onto the Medium, which provides the resulting signals back to the Data Channel and FES Channels. The Polarizing Beamsplitter in FIG. 7 corresponds to Beamsplitter BS1 in FIGS. 1, 3-6.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art, e.g., designs having collimated beams impinging of the lens closest to the optical fiber. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

EMBODIMENTS

The following is a non-exhaustive list of exemplary embodiments according to aspects of the present disclosure.

1. An optical system for a reading beam of a data channel from a moving single or multi-layer, 3-dimensional optical information storage medium, comprising:
   at least one optical element characterized by restricting the field of view (FOV) of the reading beam on an associated image plane to 0.3 to 2 Airy disk diameters in a first direction.

2. The optical system of embodiment 1, wherein the at least one optical element restricts the FOV of the reading beam by limiting FOV on a reading optical detector to 0.3 to 2 Airy disk diameters in the first direction.

3. The optical system of embodiment 1 or embodiment 2, wherein the at least one optical element restricts the FOV of the reading beam by limiting a data spot size focused on a core of an optical fiber to 0.3 to 2 Airy disk diameters in the first direction, the optical fiber coupling the reading beam to an associated reading optical detector.

4. The optical system of any one of embodiments 1-3, wherein the at least one optical element restricts the FOV of the reading beam to 0.3 to 1 Airy disk diameters in the first direction.

5. The optical system of any one of embodiments 1-3, wherein the at least one optical element limits at least one of:
   the FOV on the reading optical detector to 0.3 to 2 Airy disk diameters in the first direction; and
   a data spot size focused on the end of the optical fiber to 0.3 to 2 Airy disk diameters in the first direction.

6. The optical system of any one of embodiments 1-5, wherein the at least one optical element comprises an aperture in an optical path between the optical information storage medium and a reading optical detector.

7. The optical system of any one of embodiments 1-6, wherein the at least one optical element comprises at least first and second lenses that substantially collimate the reading beam and focus the substantially collimated reading beam into an optical fiber for coupling to an associated reading optical detector.

8. An optical system for a reading beam of a data channel from a moving three-dimensional optical information storage medium comprising:
   a reading optical detector; and
   an optical path between an objective lens and the reading optical detector; and
   wherein the reading optical detector has an active area that is sized to restrict the field of view (FOV) of the reading beam on the active area to 0.3 to 2 Airy disk diameters in a first direction.

9. The optical system of embodiment 8, wherein the active area of the reading optical detector is sized to restrict the FOV of the reading beam to 0.3 to 1 Airy disk diameter in the first direction.

10. The optical system of embodiment 8 or embodiment 9, wherein the FOV of the reading beam is restricted to a different extent in a second direction than in the first direction.

11. The optical system of any one of embodiments 8-10, wherein (a) the three-dimensional optical information storage medium is one of reflective and fluorescent and (b) the reading beam is one of reflective and Stokes-shifted fluorescent.

12. The optical system of any one of embodiments 8-11, further comprising a focus error signal (FES) subsystem having two optical fibers used for differential confocal FES detection from the optical information storage medium to generate an FES signal from the optical information storage medium.

13. An optical system for generating a focus error signal (FES) and a data signal from a moving three-dimensional optical information storage medium, comprising:
   an FES subsystem comprising first and second optical fibers used for differential confocal FES detection from the optical information storage medium, the two optical fibers having different foci with respect to the optical information storage medium; and
   a data subsystem comprising a third optical fiber focused with respect to the optical information storage medium between the foci of the two optical fibers for read signal acquisition from the optical information storage medium.

14. The optical system of embodiment 13, wherein the FES subsystem comprises one or more of the following optical elements:
   (a) at least one lens that substantially collimates a first FES beam and focuses the substantially collimated first FES beam into the first optical fiber; and further comprising at least one other lens that substantially collimates a second FES beam and focuses the substantially collimated second FES beam into the second optical fiber; and/or
   (b) at least two lenses that cooperate to substantially collimate the first FES beam and focus the substantially collimated first FES beam into the first optical fiber; and further comprising at least two other lenses that substantially collimate the second FES beam and focus the substantially collimated second FES beam into the second optical fiber; and/or
   (c) at least three lenses that cooperate to substantially collimate the first FES beam and focus the substantially collimated first FES beam into the first optical fiber; and further comprising at least three other lenses that substantially collimate the second FES beam and focus the substantially collimated second FES beam into the second optical fiber; and/or
   (d) at least one phase plate window (W) that adjusts a focus of one of the FES beams between an objective lens and at least one of the foregoing lenses; and/or
   (e) at least one phase asymmetric beam splitter (BS2) positioned to asymmetrically split a beam to form a reading beam and an FES beam; and/or
   (f) at least one phase asymmetric beam splitter (BS3) positioned to asymmetrically split the/an FES beam to form the first and second FES beams.

15. The optical system of embodiment 14, wherein one or more of the optical elements of the FES subsystem cooperate with a first and second optical fiber so that a numerical aperture (NA) of the one or more of the optical elements is mismatched with respect to an NA of the respective optical fiber so that high spatial frequency components of the light signal are not coupled into the respective optical fiber.

16. The optical system of any one of embodiments 13-15, wherein the foci of the first and second optical fibers in the FES subsystem are positioned so that their images at optical fiber inputs arise from planes equidistant on either side of the focus of the objective lens.

17. The optical system of any one of embodiments 13-16, wherein the diameter of the first and second fibers in the FES subsystem is in the range from 1 to 10 microns.

18. The optical system of any one of embodiments 13-17, further comprising at least one of a diffractive and refractive chromatic or spherochromatic aberration corrector in an optical path between the optical information storage medium and a reading optical detector.

19. The optical system of any one of embodiments 14-18, wherein one or more of the optical elements of the FES subsystem are configured and positioned to cooperate with a respective optical fiber to provide an A value of 0-5, according to the following equation:

$$A = \frac{2\pi a_0 r_0}{\lambda d} = 2\pi r_0 \frac{1.22}{D_A}$$

where: $a_0$=the pupil of the one or more of the optical elements of the FES subsystem, d=the distance of the one or more of the optical elements of the FES subsystem from the respective optical fiber, $r_0$=the respective optical fiber core radius and $\lambda$ the wavelength, $a_0/d$ defines a numerical aperture (NA) of the one or more of the optical elements of the FES subsystem, and $D_A$ in Equation 1 is the Airy disk diameter given by $1.22\lambda d/a_0 = 1.22\lambda/NA$.

20. The optical system of any one of embodiments 14-18, wherein one or more of the optical elements of the FES subsystem are configured and positioned to cooperate with a respective optical fiber to provide a FOV on the medium that is approximately the same size as a data mark dimension on the medium in one or both directions.

21. An optical system for detecting a light signal from a moving three-dimensional optical information storage medium, comprising:
   at least one lens that receives and substantially collimates a light signal and focuses the substantially collimated light signal into an optical fiber having a core diameter of 1-20 micrometers; and
   wherein the at least one lens and the optical fiber are configured, spaced, and arranged with respect to each other and cooperate with each other to provide an A value of 0-5, according to the following equation:

$$A = \frac{2\pi a_0 r_0}{\lambda d} = 2\pi r_0 \frac{1.22}{D_A}$$

where: $a_0$=the pupil of the at least one lens, d=the distance from the at least one lens to the optical fiber, $r_0$=the fiber core radius and $\lambda$ the wavelength of the light signal, $a_0/d$ defines a numerical aperture (NA) of the at least one lens, and $D_A$ in Equation 1 is the Airy disk diameter given by 1.22 $\lambda d/a_0$=1.22$\lambda$/NA.

22. The optical system of embodiment 21, wherein at least one lens and the optical fiber cooperate to increase both areal and axial digital data density in the three-dimensional optical information storage medium.

23. The optical system of embodiment 21 or embodiment 22, wherein at least one lens and the optical fiber cooperate to decrease layer spacing and to increase the axial digital data density in the three-dimensional optical information storage medium by permitting the space between active layers to be reduced.

24. The optical system of any one of embodiments 21-23, further comprising at least one chromatic or spherochromatic aberration corrector that corrects over the spectral bandwidth of the light signal.

25. The optical system of any one of embodiments 21-24, wherein at least one lens comprises first and second lenses that receive and nearly collimate the light signal and focus the nearly collimated light signal into the optical fiber.

26. The optical system of any one of embodiments 21-25, wherein:
at least one lens comprises first and second lenses that receive and substantially collimate the light signal and focus the substantially collimated light signal into the optical fiber; and
the optical system further comprises at least one of a diffractive, chromatic, and spherochromatic aberration corrector that corrects over the spectral bandwidth of the light signal.

27. The optical system of any one of embodiments 21-26, further comprising at least one phase plate window (W) that introduces a phase shift which adjusts a focus of the light signal between an objective lens and the at least one lens.

28. The optical system of any one of embodiments 21-27, further comprising at least one phase asymmetric beam splitter asymmetrically splits the light signal between an objective lens and the at least one lens.

29. A focus error signal (FES) subsystem for detecting a light signal from a moving three-dimensional optical information storage medium and generating a FES signal, comprising:
at least one FES beam splitter receiving the light signal;
a first FES channel, including at least one first FES lens that receives the light signal from a first output of the at least one FES beam splitter and substantially collimates the light signal and focuses the substantially collimated light signal into a first FES optical fiber having a core diameter of about 1-20 micrometers; and
a second FES channel, including at least one second FES lens that receives the light signal from a second output of the FES beam splitter and substantially collimates the light signal and focuses the substantially collimated light signal into a second FES optical fiber having a core diameter of about 1-20 micrometers; and
wherein the at least one first FES lens and the first FES optical fiber are configured, spaced, and arranged to decrease the FOV on the object plane of the three-dimensional optical information storage medium and increase the areal storage density of the three-dimensional optical information storage medium; and
wherein the at least one second FES lens and the second FES optical fiber are configured, spaced, and arranged to decrease the FOV on the object plane of the three-dimensional optical information storage medium and increase the areal storage density of the three-dimensional optical information storage medium; and
wherein at least one of (a) the at least one FES beam splitter, (b) the at least one first FES lens, (c) the at least one second FES lens, and (d) at least one other optical element are configured, spaced, and arranged so that the first and second FES channels have their object plane foci displaced in the axial direction so that the light signals carried by the first and second FES optical fibers can be detected and processed to generate the FES signal.

30. The focus error signal (FES) subsystem of embodiment 29, wherein at least one of (a) the at least one FES beam splitter, (b) the at least one first FES lens, (c) the at least one second FES lens, and (d) the at least one other optical element are configured, spaced, and arranged so that the first and second FES channels have their object plane foci displaced in the axial direction so that the light signals carried by the first and second FES optical fibers can be detected and processed to generate the FES signal.

31. The focus error signal (FES) subsystem of embodiment 29 or embodiment 30, wherein the at least one other optical element comprises at least one phase plate window (W) and wherein (a) the at least one FES beam splitter, (b) the at least one first FES lens, (c) the at least one second FES lens, and (d) the at least one phase plate window (W) are configured, spaced, and arranged so that the first and second FES channels have their object plane foci displaced in the axial direction so that the light signals carried by the first and second FES optical fibers can be detected and processed to generate the FES signal.

32. The focus error signal (FES) subsystem of embodiment 29 or embodiment 30, wherein the at least one other optical element comprises at least one phase plate window (W) and wherein (a) the at least one FES beam splitter, (b) the at least one first FES lens, (c) the at least one second FES lens, and (d) the at least one phase plate window (W) are configured, spaced, and arranged so that the first and second FES channels have their object plane foci displaced in the axial direction so that the light signals carried by the first and second FES optical fibers can be detected and processed to generate the FES signal.

33. The focus error signal (FES) subsystem of any one of embodiments 29-32, wherein the at least one FES beam splitter comprises a phase asymmetrical beam splitter and wherein at least one of (a) the at least one FES beam splitter, (b) the at least one first FES lens, (c) the at least one second FES lens, and (d) the at least one other optical element are configured, spaced, and arranged so that the first and second FES channels have their object plane foci displaced in the axial direction so that the light signals carried by the first and second FES optical fibers can be detected and processed to generate the FES signal.

34. The focus error signal (FES) subsystem of any one of embodiments 29-33, further comprising a data channel in accordance with any one of embodiments 1-12.

35. An optical system for reading data from a light signal from a moving three-dimensional optical information storage medium, comprising: the focus error signal (FES) subsystem according to any one of embodiments 29-33 and the data channel in accordance with any one of embodiments 1-12.

36. The system of embodiment 35, wherein the medium is a fluorescent medium emitting a polychromatic signal and the spectral bandwidth of the polychromatic signal emitted by the fluorescent medium has a full width at half maximum (FWHM) bandwidth of 20-50 nm.

The system of embodiment 3, wherein the optical fiber provides coherent detection in a reflectance type medium.

[1] T. Dabbs and M. Glass, "Fiber-optic confocal microscope: FOCON," Appl. Opt. 31(16), 3030-3025 (1992).
[2] P. M. Delaney, M. R. Harris, and R. G. King, "Fiber-optic laser scanning confocal microscope suitable for fluorescence imaging," Appl. Opt. 33(4), 573-577 (1994).
[3] S. Kimura and T. Wilson, "Confocal scanning optical microscope using single-mode fiber for signal detection," Appl. Opt. 30(16), 2143-2150 (1991).
[4] X. Gan, M. Gu, and C. J. R. Sheppard, "Fluorescent image formation in the fibre-optical confocal scanning microscope," J. Mod. Opt. 39, 825-834 (1992).
[5] M. Gu and C. J. R. Sheppard, "Signal level of the fibre-optical confocal scanning microscope," J. Mod. Opt. 38, 1621-1630 (1991).
[6] M. Gu, C. J. R. Sheppard, and X. Gan, "Image formation in a fiber-optical confocal scanning microscope," J. Opt. Soc. Am. A 8, 1755 (1991).

What is claimed is:

1. An optical system for a reading beam of a data channel from a moving single or multi-layer, 3-dimensional fluorescent information storage medium, comprising:
    a coupling lens;
    a single-mode optical fiber distally coupled to a detector;
    a numerical aperture of the coupling lens, a separation between the coupling lens and the single-mode optical fiber, and a mode diameter of the single-mode optical fiber configured to restrict the field of view (FOV) of the reading beam on an associated image plane to 0.3 to 2 Airy disk diameters in a first direction to substantially eliminate intersymbol crosstalk from reading the moving fluorescent information storage medium.

2. The optical system of claim 1, wherein the intersymbol crosstalk is caused by a finite fluorescence lifetime of read elements on the moving fluorescent information storage medium.

3. The optical system of claim 1, wherein the coupling lens and the single-mode optical fiber restrict the FOV of the reading beam by limiting an image size of a data spot focused on a core of the single-mode optical fiber to 0.3 to 2 Airy disk diameters in the first direction, the single-mode optical fiber coupling the reading beam to the detector.

4. The optical system of claim 3, wherein the coupling lens and the single-mode optical fiber limit at least one of:
    the FOV on the detector to 0.3 to 2 Airy disk diameters in the first direction; and
    an image size of a data spot size focused on the end of the single-mode optical fiber to 0.3 to 2 Airy disk diameters in the first direction.

5. The optical system of claim 1, wherein the coupling lens and the single-mode optical fiber restrict the FOV of the reading beam to 0.3 to 1 Airy disk diameters in the first direction.

6. The optical system of claim 1, further comprising at least first and second lenses that substantially collimate the reading beam and focus the substantially collimated reading beam into the single-mode optical fiber for coupling to the detector.

7. An optical system for a reading beam of a data channel from a moving three-dimensional fluorescent information storage medium comprising:
    a reading optical detector; and
    an optical path between an objective lens and the reading optical detector, the optical path comprising a coupling lens and a single-mode optical fiber; and
    wherein a numerical aperture of the coupling lens, a separation between the coupling lens and the single-mode optical fiber, and a mode diameter of the single-mode optical fiber are configured to create an active area on the reading optical detector sized to restrict the field of view (FOV) of the reading beam on the active area to 0.3 to 2 Airy disk diameters in a first direction to substantially eliminate intersymbol crosstalk from reading the moving fluorescent information storage medium.

8. The optical system of claim 7, wherein the active area of the reading optical detector is sized to restrict the FOV of the reading beam to 0.3 to 1 Airy disk diameter in the first direction.

9. The optical system of claim 8, wherein the FOV of the reading beam is restricted to a different extent in a second direction than in the first direction.

10. An optical system for detecting a light signal from a moving three-dimensional fluorescent information storage medium, comprising:
    at least one lens that receives and substantially collimates a light signal and focuses the substantially collimated light signal into a single-mode optical fiber having a core diameter of 1-20 micrometers; and
    wherein a numerical aperture of the at least one lens, a separation between the at least one lens and the single-mode optical fiber, and a mode diameter of the single-mode optical fiber configured to provide an A value greater than or equal to 0.5 and less than or equal to 10, according to the following equation:

$$A = \frac{2\pi a_0 r_0}{\lambda d} = 2\pi r_0 \frac{1.22}{D_A} \quad \text{(Equation 1)}$$

where: $a_0$=the pupil of the at least one lens, d=the distance from the at least one lens to the single-mode optical fiber, $r_0$=the fiber core radius and $\lambda$ the wavelength of the light signal, $a_0/d$ defines a numerical aperture (NA) of the at least one lens, and $D_A$ in Equation 1 is the Airy disk diameter given by 1.22 $\lambda d/a_0$=1.22$\lambda$/NA to substantially eliminate intersymbol crosstalk from reading the moving fluorescent information storage medium.

11. The optical system of claim 10, wherein the at least one lens and the single-mode optical fiber cooperate to increase both areal and axial digital data density in the three-dimensional fluorescent information storage medium.

12. The optical system of claim 10, wherein the at least one lens and the single-mode optical fiber cooperate to decrease layer spacing and to increase the axial digital data density in the three-dimensional fluorescent information storage medium by permitting the space between active layers to be reduced.

13. The optical system of claim 10, further comprising at least one chromatic or spherochromatic aberration corrector that corrects over the spectral bandwidth of the light signal.

14. The optical system of claim 10, wherein the at least one lens comprises first and second lenses that receive and nearly collimate the light signal and focus the nearly collimated light signal into the single-mode optical fiber.

15. The optical system of claim 10, wherein:
the at least one lens comprises first and second lenses that receive and substantially collimate the light signal and focus the substantially collimated light signal into the single-mode optical fiber; and
the optical system further comprises at least one of a diffractive, chromatic, and spherochromatic aberration corrector that corrects over the spectral bandwidth of the light signal.

16. The optical system of claim 10, further comprising at least one phase plate window (W) that adjusts a focus of the light signal between an objective lens and the at least one lens.

17. The optical system of claim 10, further comprising at least one phase asymmetric beam splitter that asymmetrically splits the light signal between an objective lens and the at least one lens.

* * * * *